United States Patent
Poe et al.

(10) Patent No.: US 10,801,658 B2
(45) Date of Patent: Oct. 13, 2020

(54) DIRECTED JET IMPULSE PIG LAUNCHING SYSTEM AND METHOD OF ITS USE

(71) Applicant: TDW Delaware, Inc., Wilmington, DE (US)

(72) Inventors: Roger L. Poe, Beggs, OK (US); Woody Smith, Stillwater, OK (US); David Turner, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 78 days.

(21) Appl. No.: 16/111,753

(22) Filed: Aug. 24, 2018

(65) Prior Publication Data

US 2019/0063663 A1    Feb. 28, 2019

Related U.S. Application Data

(60) Provisional application No. 62/549,500, filed on Aug. 24, 2017.

(51) Int. Cl.
*F16L 55/46*   (2006.01)
*F16L 23/00*   (2006.01)
(Continued)

(52) U.S. Cl.
CPC .............. *F16L 55/46* (2013.01); *F16L 23/003* (2013.01); *F16L 23/006* (2013.01);
(Continued)

(58) Field of Classification Search
CPC ....... F16L 55/46; F16L 23/006; F16L 41/004; F16L 23/003; F16L 55/38; B08B 9/055; B08B 9/0551; Y10T 137/0435
See application file for complete search history.

(56) References Cited

U.S. PATENT DOCUMENTS 3,266,076 A  *  8/1966  Surber ..................... F16L 55/46
                                            15/104.062
3,978,708 A  *  9/1976  Hayward ............ G01F 25/0015
                                               73/1.18
(Continued)

FOREIGN PATENT DOCUMENTS

CN           2208990 Y      10/1995
CN         102755979 A      10/2012
(Continued)

*Primary Examiner* — Matthew W Jellett
*Assistant Examiner* — Christopher D Ballman
(74) *Attorney, Agent, or Firm* — Gable Gotwals

(57) ABSTRACT

A pig trap of this disclosure may include one or more injectors or nozzles located along a sidewall of the barrel and oriented to deliver a jet of fluid toward a back side of a vertical member of a pig or tool. The nozzle may be part of an assembly that includes a longitudinally extending pipe having a flat-profile flange at an inlet end, a curved-profile flange at the nozzle end, and a bend in between the two ends. When the assembly is installed in a sidewall opening of a pig trap, the nozzle delivers a jet of fluid toward the back side of a vertical member of the pig. A leak path may be provided through flanges or formed between the sidewall opening and a periphery of the curved-profile flange. Launch forces of more than 10 to 15 times that of a conventional launcher may be achieved.

19 Claims, 10 Drawing Sheets

(51) Int. Cl.
*F16L 41/00* (2006.01)
*F16L 55/38* (2006.01)
*B08B 9/055* (2006.01)

(52) U.S. Cl.
CPC ............ *F16L 41/004* (2013.01); *F16L 55/38* (2013.01); *B08B 9/055* (2013.01); *B08B 9/0551* (2013.01); *Y10T 137/0435* (2015.04)

(56) References Cited

U.S. PATENT DOCUMENTS

| | | | | |
|---|---|---|---|---|
| 4,237,921 A * | 12/1980 | Hayward | ............ | G01F 25/0015 137/268 |
| 4,719,936 A | 1/1988 | Tsubakimoto et al. | | |
| 4,793,016 A * | 12/1988 | Valentine | ................ | F16L 55/46 137/268 |
| 5,139,576 A * | 8/1992 | Davis | ....................... | F16L 55/46 134/18 |
| 5,927,319 A * | 7/1999 | Burkhalter | ............. | B08B 9/055 137/268 |
| 7,956,137 B2 * | 6/2011 | Adams | ................. | B01J 19/2435 134/166 R |
| 8,733,187 B2 * | 5/2014 | Loftstrom | ............... | F16L 55/46 73/865.8 |
| 9,651,190 B1 | 5/2017 | Hailey | | |
| 2008/0265567 A1 | 10/2008 | Morris | | |
| 2009/0083922 A1* | 4/2009 | Watson | ................... | F16L 55/46 15/104.062 |
| 2011/0259594 A1 | 10/2011 | Rosen | | |
| 2012/0090414 A1 | 4/2012 | Kearns et al. | | |
| 2012/0131758 A1* | 5/2012 | Bacon | .................... | F16L 55/38 15/104.062 |
| 2012/0255933 A1 | 10/2012 | McKay et al. | | |
| 2015/0136240 A1 | 5/2015 | Sundholm | | |
| 2016/0369930 A1 | 12/2016 | Poe et al. | | |
| 2017/0110859 A1* | 4/2017 | Gjerull | .................... | F16L 55/46 |
| 2019/0024837 A1* | 1/2019 | Filippovitch | ........... | F16L 55/46 |

FOREIGN PATENT DOCUMENTS

| | | |
|---|---|---|
| DE | 102007056822 A1 | 6/2009 |
| FR | 2349782 A1 | 11/1977 |
| JP | S58141786 U | 9/1983 |

* cited by examiner

DIRECTED JET IMPULSE PIG LAUNCHING SYSTEM AND METHOD OF ITS USE

CROSS-REFERENCE TO RELATED APPLICATIONS

This application is a conversion application which claims priority to U.S. Provisional No. 62/549,500 filed Aug. 24, 2017, which is incorporated herein by reference.

BACKGROUND

This disclosure relates to pig traps or launchers used to launch a pipeline pig or a diagnostic tool into a pipeline system. The primary purpose of a pig launcher is to launch the pig or tool into the pipeline system without interruption of fluid flow through that system.

Pig launching (and receiving) systems vary from one to another depending on specific purpose and product. Those variations include such things as placement of valves, automated mechanisms, length of the launch tube or barrel, type of closure door, and the means to move a pig into the reduced cross-section area of the barrel (e.g. gravity, screws). Regardless of those variations, all launchers and receivers include the barrel, which holds one or more pigs or tools, and a large branch connection which connects the barrel to the pipeline system. When ready to launch a pig into the pipeline system, a tee section diverts pipeline fluid flow into the end of the barrel, behind one or more of the pigs positioned in the barrel. Gravity and dynamic pressure are used to move a pig into position for launching and to launch the pig. In some conditions, these fluid and mechanical properties are insufficient for launching and manual intervention is required.

The launchers are not designed as an efficient fluids device, nor are they designed so that a maximum force is applied where it might be most effective to launch a pig. Instead, fluid enters the barrel as a fluid jet perpendicular to the wall of the barrel. The momentum of the jet crosses from one side of the barrel to the other, diminishing most of the momentum and dropping its dynamic pressure to the pressure of the barrel without doing any immediate work.

Additionally, the fluid flow is typically at a relatively low velocity due to the large diameter of the pipe branch or stub entering the barrel. For example, the kicker line is typically about one-third the diameter of the mainline (e.g. a 12-inch [30.48 cm] main, 4-inch [10.16 cm] kicker). Prior art launch units do not typically allow for fluid streams in excess of 7.3 feet per second (about 2.23 meters per second) and at most, in very rare occasions, 30 feet per second (9.14 meters per second), where pipeline product flow is in a range to support those velocities. Velocities in this range create stagnation pressures of about 0.3 inches (0.762 cm) of water column or 0.01 psig (about 0.07 kpa). Applied to the back side of a pigging element having an area of 100 square inches (645.2 square cm), a force of approximately 1 lbf. (4.45 N) is created.

Under some conditions, impediments to launching—such as oxidized metals and sand, debris, ice, and paraffin—can resist or impede movement of the pig. If the pig does not readily move into position for launching, the required pressure does not build behind the pig and the pig cannot subsequently launch into the piping system.

In many cases the launcher will contain several pigs or tools waiting to be launched. Some mechanical means, such as hydraulically activated pins, must be employed to ensure all of the pigs do not launch at once. The cost to contain and control these pigs is significant to support the needed hydraulic cylinders, added weldment sites on the barrel, hydraulic cylinder attachments, hydraulic power units to power the cylinders, and controls specific to the hydraulics to control which pig is launched.

SUMMARY

Embodiments of a directed jet impulse pig launch system and method of this disclosure move a pig or tool into the launch position without the need of mechanical-assist devices or inclined structures. In embodiments, at least one nozzle may be arranged along an inside wall of a pig trap at a non-normal or oblique angle less than 90° relative to horizontal and sized to deliver a jet of fluid in a downstream direction at a velocity greater than that of a main pipeline product flow in fluid communication with the pig trap nozzle assembly. A portion of a main pipeline product flow may be directed into the nozzle, which in turns, provides an impulse force on back side of a working surface of the pig in a direction of launch. A control system may be used including non-transitory computer readable media that executes an algorithm to open and close appropriate valves in fluid communication with the at least one nozzle and a main pipeline to facilitate the launch of the pig and report the launch.

The system and method provides a simpler and more trouble-free approach to launching a pig or diagnostic tool into a pipeline system than prior art launch systems. Rather than delivering a low velocity fluid jet that crosses from one side of the barrel to the other before doing any immediate work, the system applies a high velocity fluid jet (sonic in some cases) directed toward a working surface of the pig, such as a vertical member like a urethane element (disk or cup). This approach provides for more reliable execution of a predetermined launch sequence and can eliminate the need for mechanical means to prevent premature launching. Launch forces of more than 10 to 15 times that of a conventional launcher may be achieved.

The launch system may be implemented at the fabrication stage of a new launcher or retrofitted into an existing launcher. The launch system also may be applied to a receiver to allow the receiver to double as a launcher when bi-directional capabilities are valued. In some embodiments, a ported butterfly valve ahead of the tee section may be used to divert pipeline fluid flow from the main line and help control or modulate that flow to the launch system.

In embodiments, the launch system applies an impulse or momentum-based force to the pig in the form of a concentrated, high velocity fluid jet. The jet may be the pipeline product fluid (transmission fluid), a secondary fluid compatible with the transmission fluid, or some combination of transmission and secondary fluids, could be used. The jet envelope may entrain the secondary fluid, as well as solids and sediments.

The jet, which is discharged from an injector or nozzle, may be directed at a leading urethane element (disk or cup) of the pig, a trailing urethane element, or a urethane element located between the leading and trailing disks or cups. For example, when directed at a back of the leading urethane element, the impulse force provided by the jet overcomes static friction and, once the pig begins movement, overcomes dynamic friction and accelerates the pig as subsequent urethane elements or other vertical members are impinged upon by the jet.

Each injector or nozzle may be placed at any clock position desirable about the barrel and directed downstream.

Regardless of clock position, the nozzle may be oriented at an oblique angle relative to a central longitudinal axis of the barrel or at a right angle to the central longitudinal axis. In some embodiments, the nozzle is located so the jet is directed underneath or to a backside of the pig. In other embodiments, two or more nozzles are used within an effective launch area for a pig.

A series of injectors or nozzles may be arranged along the barrel to add additional force or so that two or more pigs may be sequentially launched from the barrel according to a predetermined time sequence. In some embodiments, because of the spacing between the two or more pigs, no mechanical means are required to hold each pig into position and prevent a premature launch. In other embodiments, additional nozzles may be oriented in an upstream direction to provide a force that prevents forward movement as a downstream pig is being launched. In yet other embodiments, the launch system may include a screw-type device that moves the pig or tool into a launch position, with the injector then providing the impulse force to launch the pig.

In some other embodiments, a distribution grid may be arranged above a lower floor portion of the barrel so that the distribution grid positions fluid entering the barrel in such a way that the fluid immediately interacts with a pig or diagnostic tool lined up in the barrel to lift the pig or tool and negate the effects of friction. Reducing friction significantly increases the ease at which a pig can be launched; it also eliminates the chances of miss-launched pigs due to drag on the pig or ice formations. The fluid may enter the barrel in the same or similar way as that of prior art launchers.

The distribution grid can be a perforated matrix in the form of a sheet having a plurality of ports, some of which may be angled in the launch direction, that create fluid jets (and therefore a differential pressure) which lift the pig vertically away from the floor and axially moves the pig into the launch direction. This arrangement permits even a horizontal launcher to move a pig forward and into the pipeline with only pressure and momentum.

BRIEF DESCRIPTION OF THE DRAWINGS

FIG. 3 is a front elevation view of an embodiment of the injector or nozzle assembly prior to installation. The assembly includes a flat-profile (pancake) flange at an inlet end and a curved-profile plate or flange at the outlet or nozzle end. The flat-profile flange may be configured to fit between the two kicker line flanges on a typical launcher. The smaller curved-profile flange may be fitted to the inside surface of the barrel of the launcher. A bend provides an oblique nozzle angle relative to the horizontal. The flat-profile flange may include one or more ports to provide a leak path for pressure equalization.

FIG. 4 is a side elevation view of the embodiment of FIG. 3.

FIG. 5 is a top plan view of the embodiment of FIG. 3.

FIG. 6 is a cross-section view of the embodiment of FIG. 3.

FIG. 7 is a view of the injector or nozzle assembly's smaller diameter end as it terminates to integrate the nozzle into the surface of the barrel. A pig was placed into the barrel to better show how the free jet exiting from the nozzle may interact with a vertical element located toward the back side of the pig. In other embodiments, the nozzle may be placed such that a front or more forward vertical element would be the first point of interaction.

FIG. 8 is a view showing where an injector or nozzle assembly may be installed or placed into the barrel area of the launcher that includes a fluid distribution grid useful for heavy pigs. In some embodiments, the grid sits below the nozzle. In other embodiments, the nozzle may connect to a sidewall of the grid. Multiple nozzles may be used with, or in lieu of, the grid.

FIG. 9 is an exploded assembly view of an embedment of an injector or nozzle assembly of this disclosure. The mounting pancake flange may be located between the two kicker line flanges. In some embodiments, the flange may include a leak path to provide pressure equalization.

FIG. 11 is a view showing where an injector or nozzle assembly may be installed or placed into the barrel area of the launcher. Other installation arrangements, including but not limited to different clock positions about the barrel or relative to the barrel, may be used.

DEFINITIONS

For the purposes of this disclosure, a high velocity jet, —also referred to herein as a concentrated jet or a directed jet—is a fluid jet exiting a discharge area of an injector or nozzle toward a specific, predetermined area on a back side of a working surface of the pig or tool at a velocity greater than that of a main pipeline flow velocity to create concentrated forces concentrated forces significantly higher than the forces generated when pipeline product flows into the back of the launcher as is the case with a typical kicker line operation. The fluid jet enters the barrel at a non-normal angle relative to the centerline of barrel.

The fluid may be a portion of a pipeline product flowing thorough a main pipeline and diverted into and through the nozzle. The high velocity, which may be maintained over a length greater than at least twice that of the pig or tool diameter, is sufficient to generate a force at time "t" greater than the static or dynamic friction force experienced at time t by the pig or diagnostic tool. Two or more nozzles may be used to satisfy or exceed this force requirement. A supersonic nozzle may also be used to expand this force to the pig.

A low velocity (prior art) fluid stream is one entering a launcher barrel through a typical kicker line operation and not directed toward a specific, predetermined area on a back side of a working surface of the pig or tool. A low velocity fluid stream typically enters the barrel from the full kicker line diameter and normal to the centerline of the barrel.

The terms launcher and pig trap may be used interchangeably throughout this disclosure. The launcher or trap may be configured as a launcher, a receiver, or both.

The terms injector and nozzle, or injector assembly and nozzle assembly, may be used interchangeably throughout this disclosure.

The terms pipeline pig and diagnostic tool may be used interchangeably. Each includes a mandrel body that typically has two or more elastomeric disks, cups, or sealing elements located about the body so that the pig or tool may move forward through a pipeline under differential pressure.

A downstream or launch direction is a direction away from or opposite that of a closure door of the launcher barrel. When in a launch position, a rearward end of a pig or tool is located toward the closure door side of the launcher barrel with a forward end of the pig or tool located toward the main pipeline flow. Back portions of the pig's or tool's working surfaces face the closure door side.

Working surfaces of the pipeline pig or tool are surfaces projecting laterally outward from the mandrel body of the pig or tool, typically at a 90° angle relative to a central longitudinal axis of the mandrel body. An example of a working surface is the area presented by a vertical member such as an elastomeric or urethane sealing element. The sealing element may be a cup or disk (or their equivalents).

DETAILED DESCRIPTION

Figure 10:
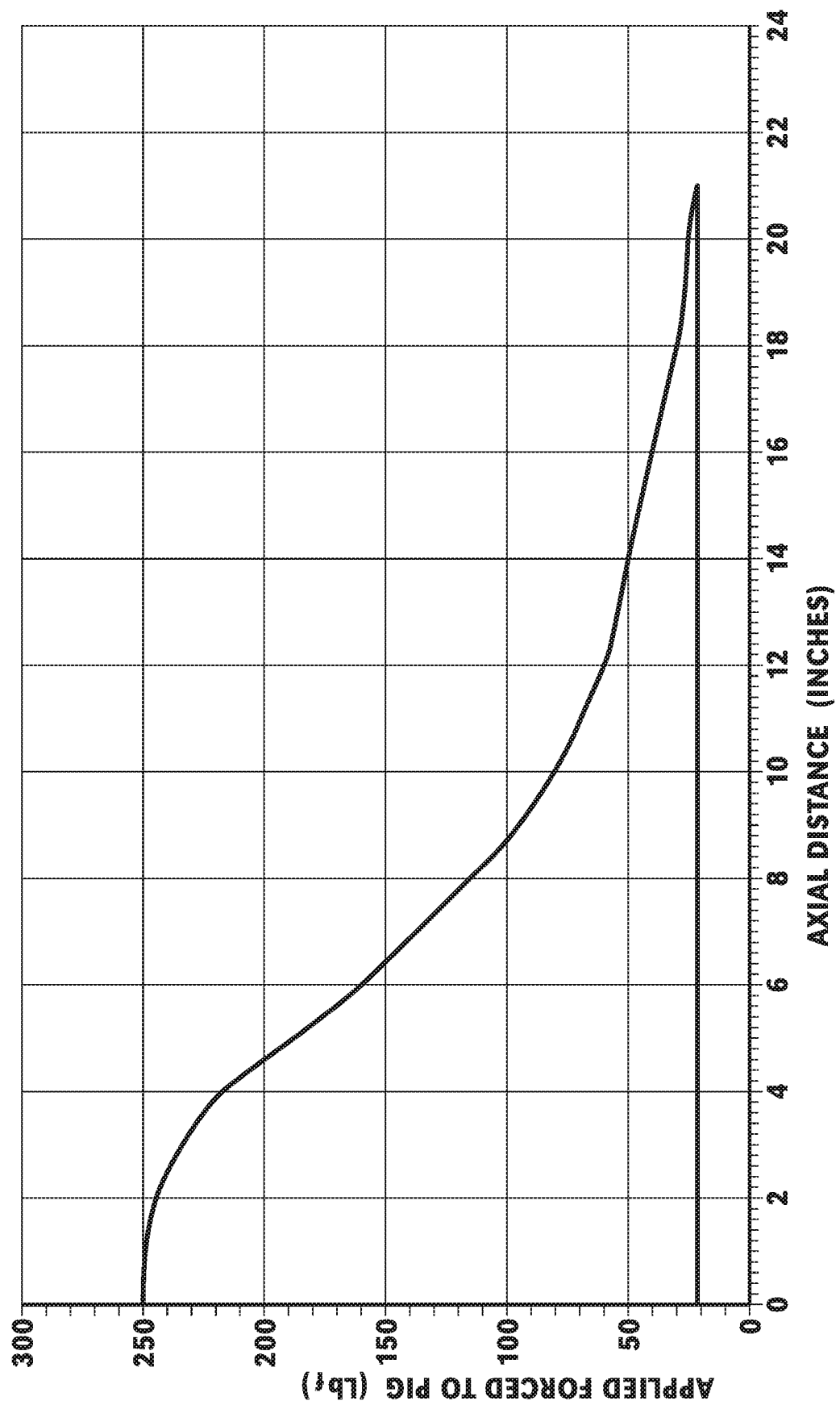
FIG. 10 is a graph illustrating—for an equivalent sized launcher, pig, and pipeline flow velocity—the relative difference in launch force generated by embodiments of this disclosure as compared to the force generated by prior art launch designs that direct low velocity flow in perpendicular direction into the launcher. Design parameter changes can affect this relative difference. By way of a non-limiting example, increased launch force—and therefore an increased relative difference—may be achieved by increasing area, increasing differential pressure, or by using a supersonic nozzle increase.

Embodiments of a directed jet pig or tool launch system and method of this disclosure allow fluid that enters a barrel of a launcher (trap) to serve as a highly concentrated fluidic impulse or momentum force that moves a pig or diagnostic tool into the launch position. Rather than delivering a low velocity fluid jet that crosses from one side of the barrel to the other before doing any immediate work, the system am a high velocity fluid jet (sonic in some cases) directed toward a working surface of the pig, such as a vertical member like a urethane element (disk or cup). This approach provides for more reliable execution of a predetermined launch sequence and can eliminate the need for mechanical means to prevent premature launching. Launch forces of more than 10 to 15 times that of a conventional launcher may be achieved. See e.g. FIG. 10. Additionally, the launch force may be maintained over a longer length (as measured as a multiple of pig diameter) than can be accomplished with the prior art.

Positioning pins may also along the barrel to position the multiple pigs or tools for staging. Embodiments may also allow for bidirectional pig launching capability. For example, a receiver pig trap can become a launcher and send the pig back toward where it originated.

In embodiments, at least one injector or nozzle may be placed in the wall of the launcher for each pig loaded within the launcher or barrel and directed in a downstream direction at the pig's working surfaces to deliver a concentrated jet of fluid to a back or rearward facing portion of those surfaces. The working surfaces may be a vertical member like an elastomeric or urethane element such as, but not limited to, a disk or cup of a kind known in the art and used as sealing elements that help move the pig or tool forward under differential pressure. In some embodiments, the jet is directed toward a surface area located in a lower half of the back side of the vertical member. Part of the jet against the mandrel body of the pig or tool also lifts the pig to reduce the normal force (e.g., weight) which, in turn, reduces the impact of friction. Immediately upon delivery, the entirely of the jet acts against the pig as opposed to the prior art, where a portion of the fluid crosses from one side of the barrel to the other.

The system and method can significantly reduce the hardware and weldment needed to initiate the launching of a single pig or diagnostic tool or multiple pigs or tools. The savings in cost can be significant. For example, the size of the branch circuits or kicker lines coming into the launcher would typically be smaller than would be the case in a same-sized prior art launcher, thereby reducing fabrication costs. By way of a non-limiting example, the cross-sectional area of the nozzle line may be $\frac{1}{12}$th that of a typical branch or kicker line (e.g. 1-inch nozzle line, 4-inch kicker line). In other embodiments, the cross-sectional area of the line may be $\frac{1}{10}$th that of the kicker line. A launcher having kicker lines may also be retrofitted with those lines being used as injector or nozzle locations. In some embodiments, the injector assemblies can slip into the kicker portal as an integral subassembly that is held in place by the kicker line flanges.

Figure 1:
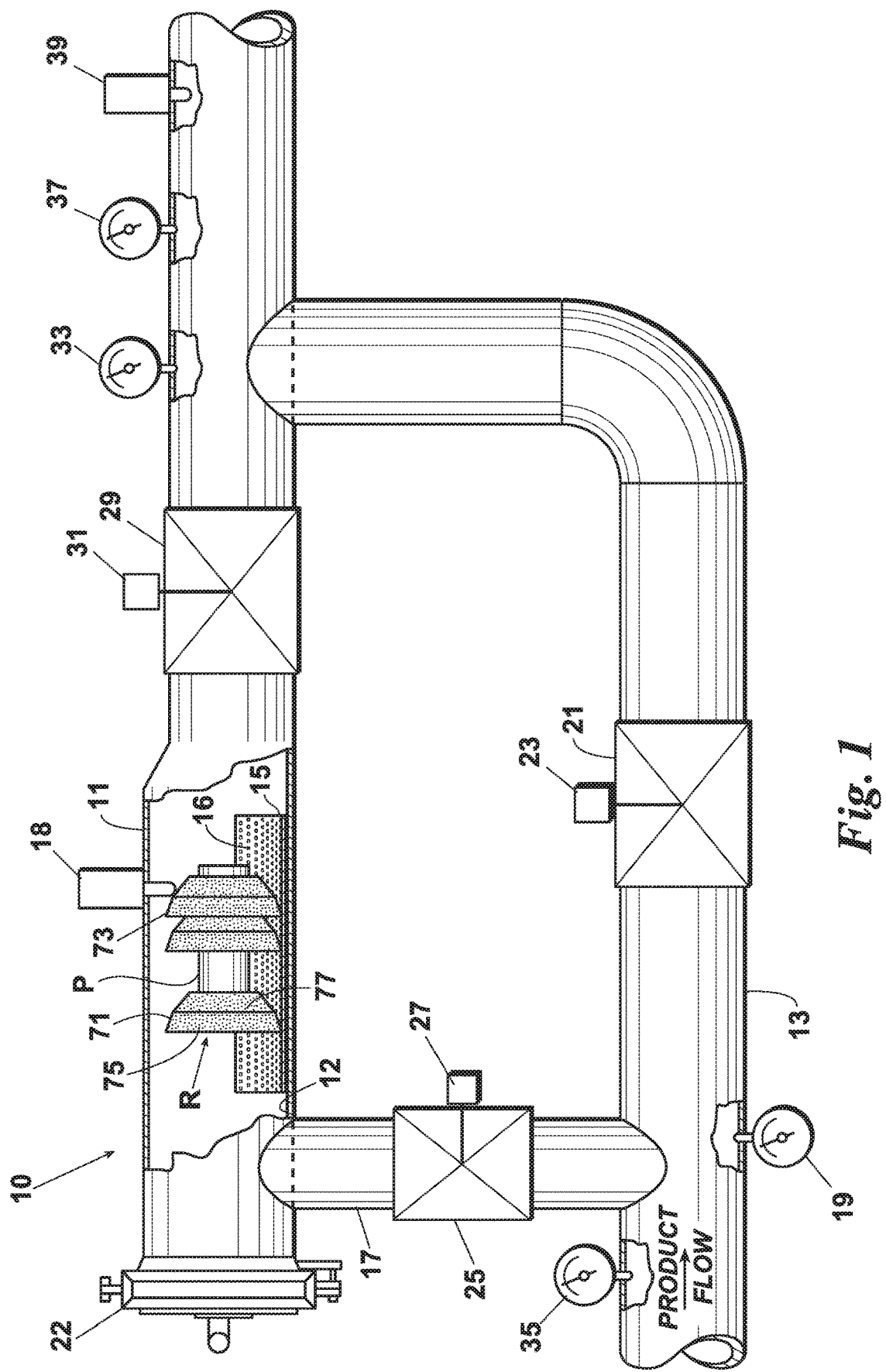
FIG. 1 is a schematic of a prior art pig launcher or trap having an optional fluidic tray or distribution grid. In an improved pig trap of this disclosure, the launcher—with or without the distribution grid—may be modified by placing one or more injectors or nozzles of this disclosure, see e.g.
Figure 2:
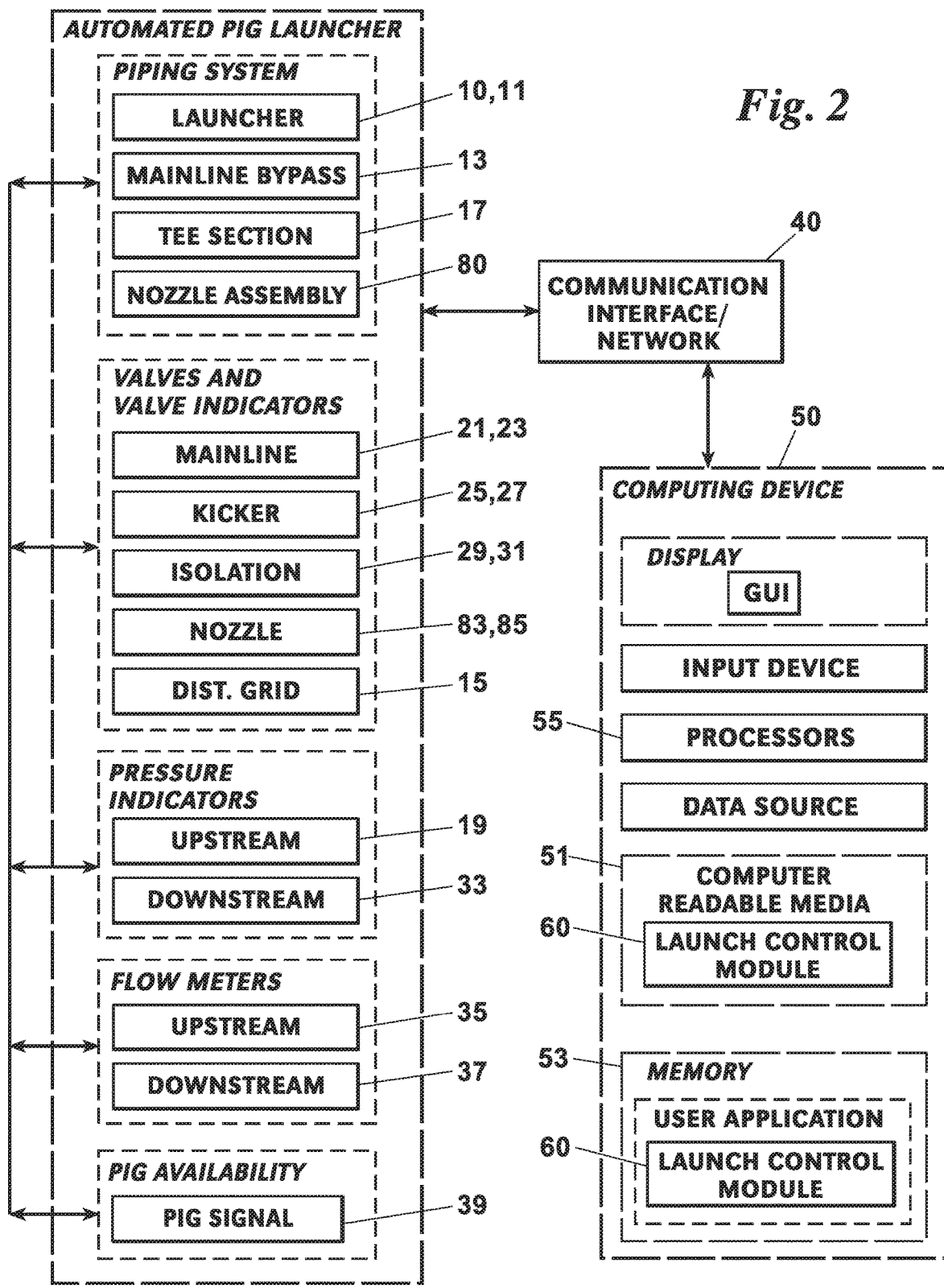
FIG. 2 is a schematic of an embodiment of a control system that may be used in connection with a pig launch system of this disclosure.
Figure 5:
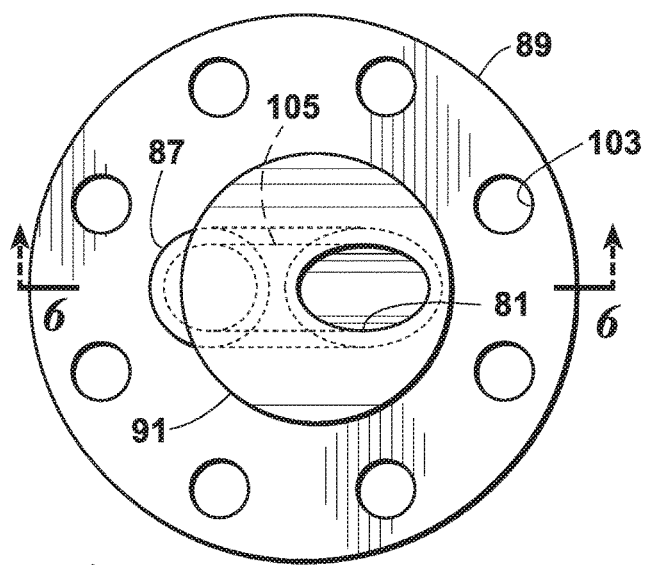
FIGS. 3-9 & 11, along the barrel of the launcher and pointed in a downstream direction to deliver a high velocity, concentrated jet of fluid to a vertical member of a pig or diagnostic tool to be launched. Valves may be used to control flow into the barrel and to the nozzles. Valve indicators, along with pressure, flow, and temperature sensors, may send signals to a control system that automatically opens and closes the valves when and where appropriate to launch the pig or diagnostic tool into a main pipeline.
Figure 6:
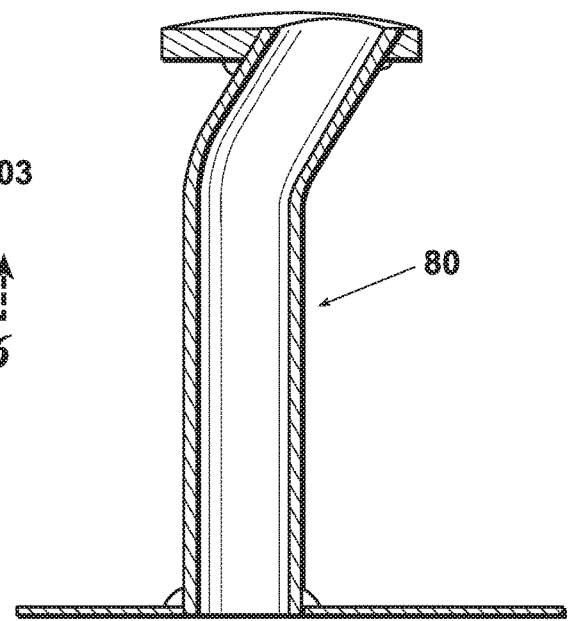
Figure 3:
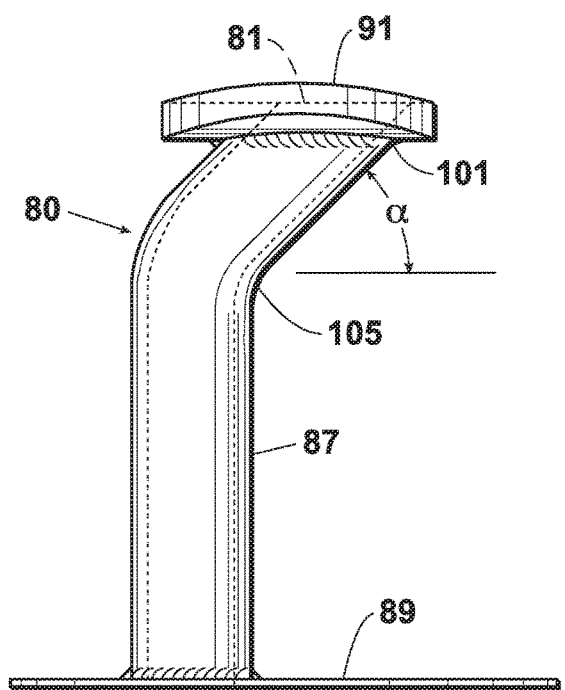
Figure 4:
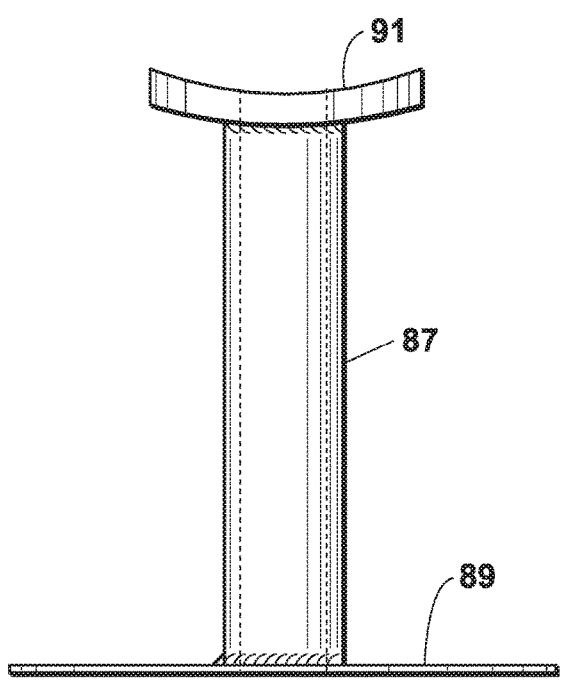
Figure 7:
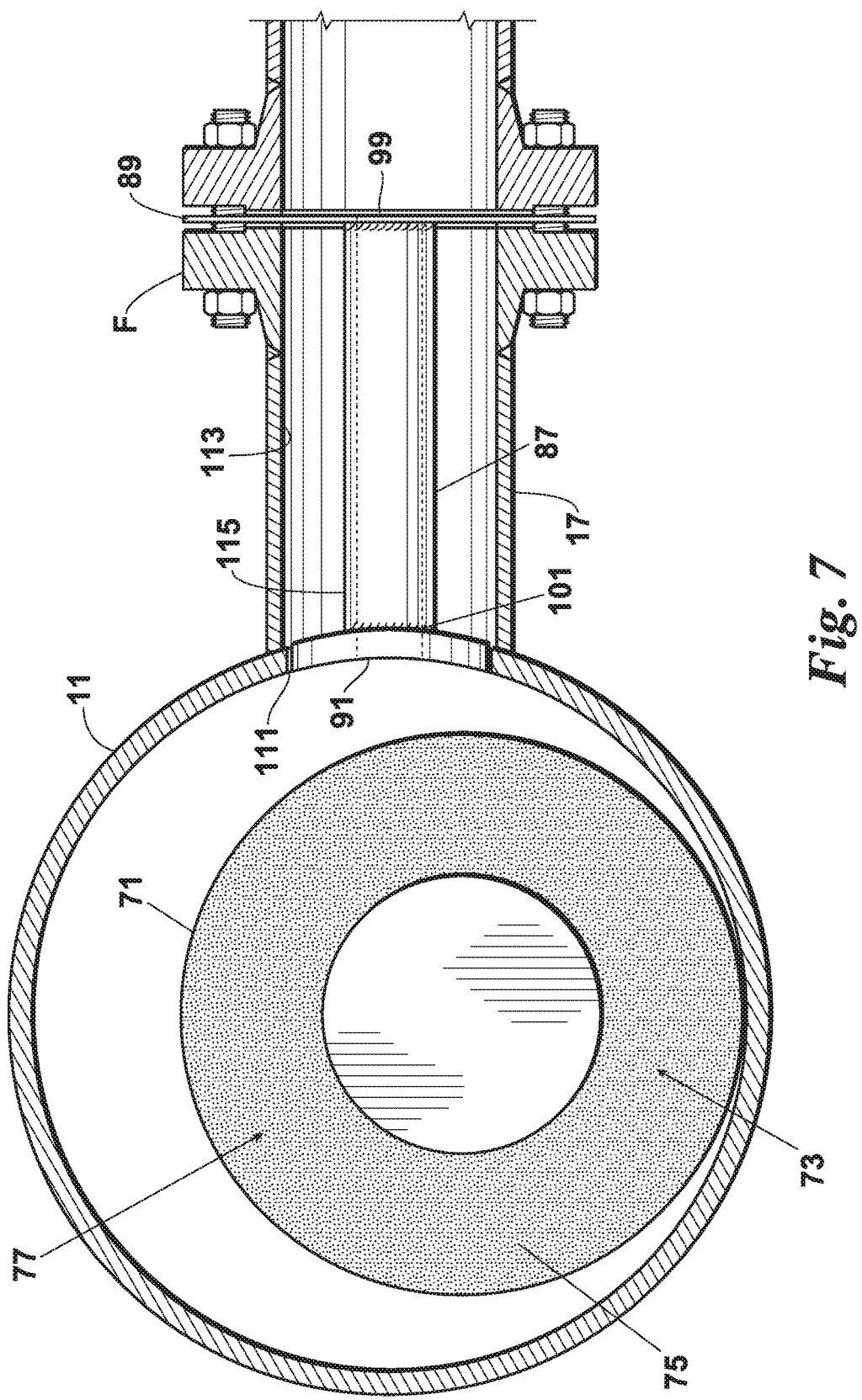
Figure 9:
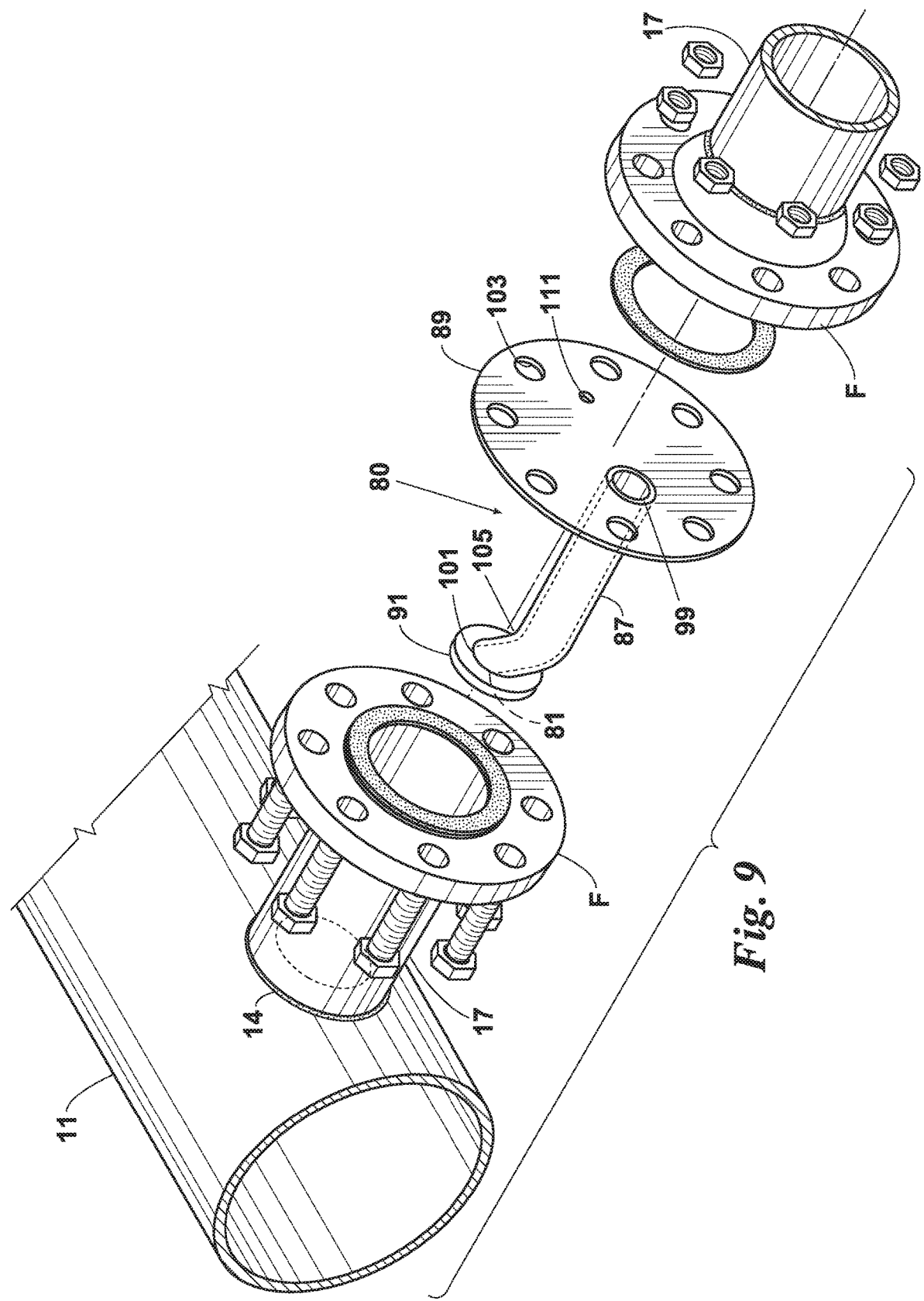

In some embodiments, a separate header maintains one or more points of application to allow the fluid flow to be diverted to the injectors or nozzles by means of a series of control valves. The fluid may be a liquid or a gas and may be a portion of a main pipeline product flow. The control valves may be solenoid valves. A control scheme is then employed to determine which control valve to open, when to open it, and for how long. Referring to FIGS. 1, 2, and 9, embodiments of the launch system and method may be configured to operate with a pig trap or launcher 10 including a barrel 11 having a closure door 22 at one end configured for connection to a mainline bypass (header) 13 along a sidewall the barrel 11. Header 13 is connected to a mainline 15 and may include one or more tee sections or kicker lines (branch connection) 17. In some embodiments, launcher 10 may be configured as a launcher/receiver. A main line bypass valve 21—which can be a butterfly valve or a ported butterfly valve—may be arranged to bring a main product or transmission fluid into the header 13, through the branch connection 17, and into barrel 11 of the launcher 10 where the fluid is delivered through one or more nozzle assemblies 80 including at least one injector or nozzle 81. The nozzle assemblies 80 may be located toward a barrel end 14 of the branch connection 17, with the nozzle's discharge area exposed to the interior space of the barrel 11. In some embodiments, the nozzle assembly 80 may be configured such that the nozzle 81 is flush or almost flush with the barrel wall 12. Within the barrel 11, a launch pin 18 may hold a pig or diagnostic tool "P" in its launch position and awaiting the main product or transmission fluid flow into the barrel 11.

In some embodiments, the directed jet system and method of this disclosure can be married with a "fluidic tray" system the same or similar to that disclosed in US 2016/0369930 A1, the subject matter of which is incorporated by reference into the present disclosure. This combination can be useful where excessively heavy pigs must be launched. For example, launching of pigs in a range of 150 lbs. to 200 lbs. (or more) may be assisted using the tray. The directed jet system may still effectively launch these heavier pigs and multiple jets may be applied at a location. The fluidic tray 15, which may be in the form of a perforated matrix or sheet with ports 16, reduces friction in low buoyancy mediums to better allow auto launching of these large pigging devices. A plurality of the ports 16 may be angled in the launch direction.

Figure 15:
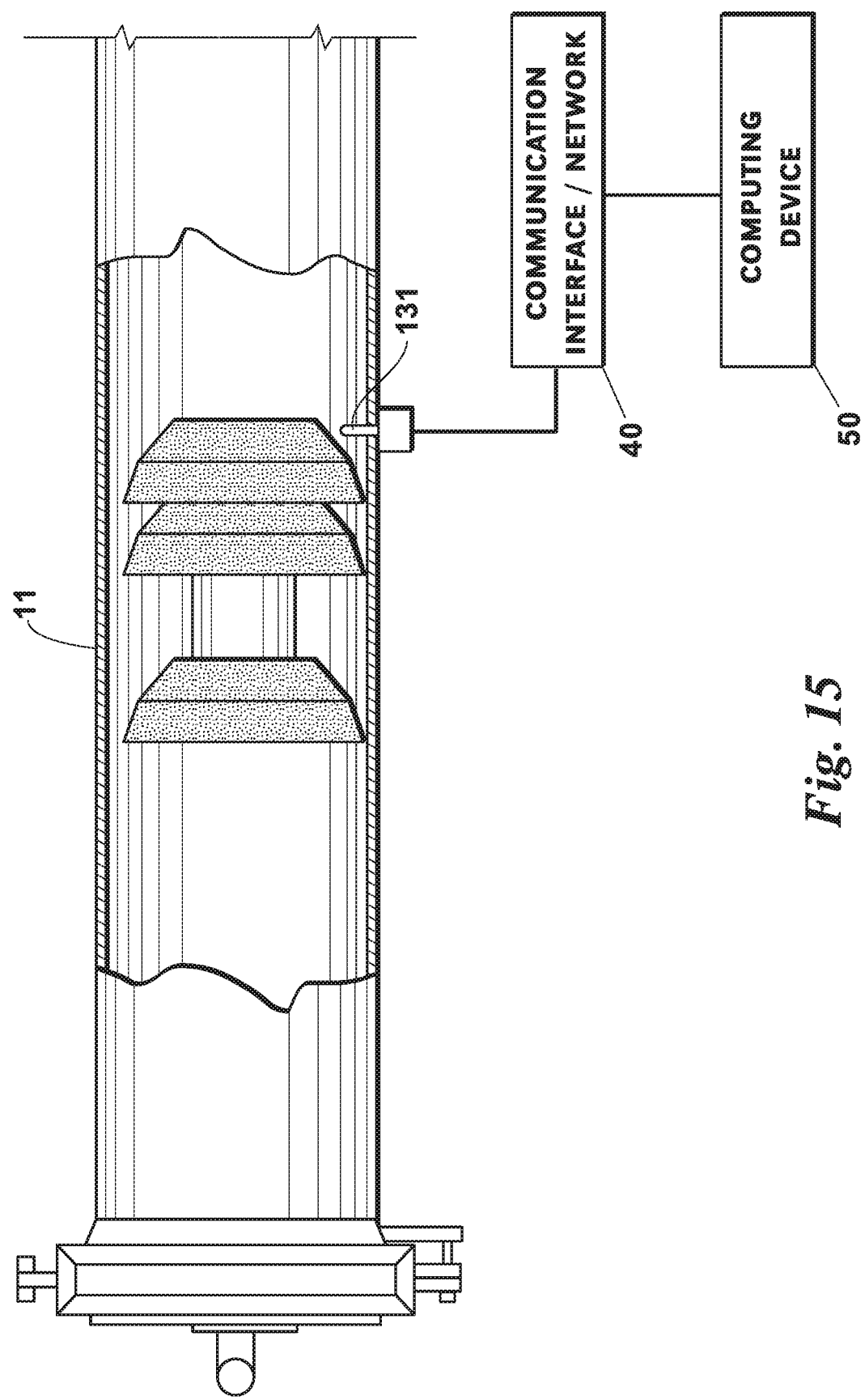
FIG. 15 is a schematic of an embodiment of this disclosure that makes use of small pneumatic, hydraulic, or other actuated, spaced-apart pins to position one or more pigs for staging and signal an operator as to each pig's position in the launcher.

Positioning pins 131 may also be located along the barrel 11 to position the multiple pigs or tools for staging. See e.g. FIG. 15. The pins 131 may be spaced at predetermined intervals that correspond with staging and may be pneumatic or hydraulic pins (or their equivalent). Embodiments may also allow for bidirectional pig launching capability. For example, a receiver pig trap can become a launcher and send the pig back toward where it originated.

When the main line bypass valve 21 is partially closed or throttled, a controlled fraction of the main product or transmission fluid flows into the line 17 containing nozzle assembly 80. The pressure inside the launcher barrel 11 temporarily drops (usually for about one second or so) to create a differential pressure at the nozzle 81, which establishes a high velocity jet directed toward a working surface 71 of the pig or diagnostic tool "P." The nozzle 81 is configured and oriented to deliver a concentrated jet of fluid to a working surface of a pig or diagnostic tool "P" to be launched into a pipeline system. None of the jet discharged by the nozzle 81 is directed such that a portion of the jet crosses the barrel 11 before doing immediate work. Rather, the jet immediately impinges upon a working surface 71 of the pig or tool. In some embodiments, the jet may travel at a sonic or near-sonic discharge velocity. In applications where the transmission fluid is a gas, the discharge velocity can be greater than 1,000 feet per second (304.8 mps). If a converging-and-diverging (or de Laval) nozzle or its equivalent is used, the velocities could extend into the supersonic range.

Fluid flow to the nozzles 81 may be controlled by one or more control valves 83. The control valve 83 may be opened to allow the elevated pressure to be realized at the nozzle interface. The control valves 83 may be solenoid valves. A control scheme may be employed to determine which control valve 83 to open, when to open it, and for how long.

Once a pig is launched, a pig signal indicator 39 may be used to indicate its passage into the mainline 15. Valves—which may include a mainline bypass valve 21, kicker valve 25, isolation valve 29, and nozzle valve 83—may be monitored by a respective valve indicator 23, 27, 31, 85 to determine whether the valve 21, 25, 29, 83 is correctly indicating a known state. The valve indicators may be indicators of a kind known in the art to monitor a valve state.

The launch pin 18, valve indicators 23, 27, 31, 85 and pig signal indicator 39 may be in communication with a communication interface 40—which can be connected to or part of a PLC network or a mobile network—in communication with a computing device 50 having a flow assurance module 60. The same is true of pressure sensors or indicators 19, 33 and flow meters 35, 37. The flow assurance module 60 may be the same as, or similar to, the flow assurance module disclosed in U.S. Pat. No. 9,651,190 B1 to TDW Delaware, Inc, the contents of which is incorporated by reference herein. If a distribution grid is used, a separate grid valve 9 may be used and monitored.

Valve state data from the valve indicators 23, 27, 31, 85; differential pressure data from pressure indicators 19, 33; and flow data from meters 35, 37 may be passed through the interface 40 for processing by one or more microprocessors 55 of computing device 50. The microprocessor 55, together with the computer-readable media 51 and memory 53 of the computing device 50, may be configured to implement the flow assurance module 60. The known number of pigs loaded into the launcher barrel 11, along with data from the retractable pin 18 and pig signal indicator 39, may be used to determine available pig status.

Referring now to FIGS. 3-7 and 9, an injector or nozzle assembly 80 of this disclosure may also include a longitudinally extending pipe 87 having a flat-profile flange 89 located toward or at an inlet end 99, a curved-profile flange or plate 91 located toward or at an outlet (nozzle or discharge) end 101, and at least one bend 105 between the two ends 99, 101. In embodiments, the pipe 87 is not coaxial to the flat-profile flange 89, the inlet end 99 being offset from a centerline of the flange 89. The curved-profile flange 91 may include a nozzle opening 82 sized to receive the nozzle 81. The bend 105 may be at an oblique angle α relative to the horizontal. (The angle α may also be referred to in this description as the nozzle angle.)

The flat-profile flange 89, which may be a pancake (thin) flange, may be positioned between flanges "F" of a branch connection 17. The bolt holes 103 in the flange 89 allow the nozzle 81 to be positioned radially with respect to the launcher 11. The flange 89 serves as a restriction. In some embodiments, the flange 89 may include one or more ports that provide a leak path 111 for pressure equalization. In other embodiments, the flange 89 does not include the ports.

The curved-profile plate 91 may match the curvature of the wall 12 of the barrel 11. In some embodiments, plate 91 may be a curved coupon flange. The curvature indexes the nozzle 81 and allows a passageway or leak path 111 to allow the annular area 113 to fill with fluid and pressurize around the outside annular surface 115 of the nozzle assembly 80. This construction ensures that the pressure differential around the (compressible) outside of the nozzle body is zero so the nozzle assembly 80 is not deformed or crushed. In some embodiments, the plate 91 may not be welded completely to provide the leak path 111. In other embodiments, the plate 91 may include one or more ports 92 to provide the leak path 111. See e.g. FIG. 12.

Figure 8:
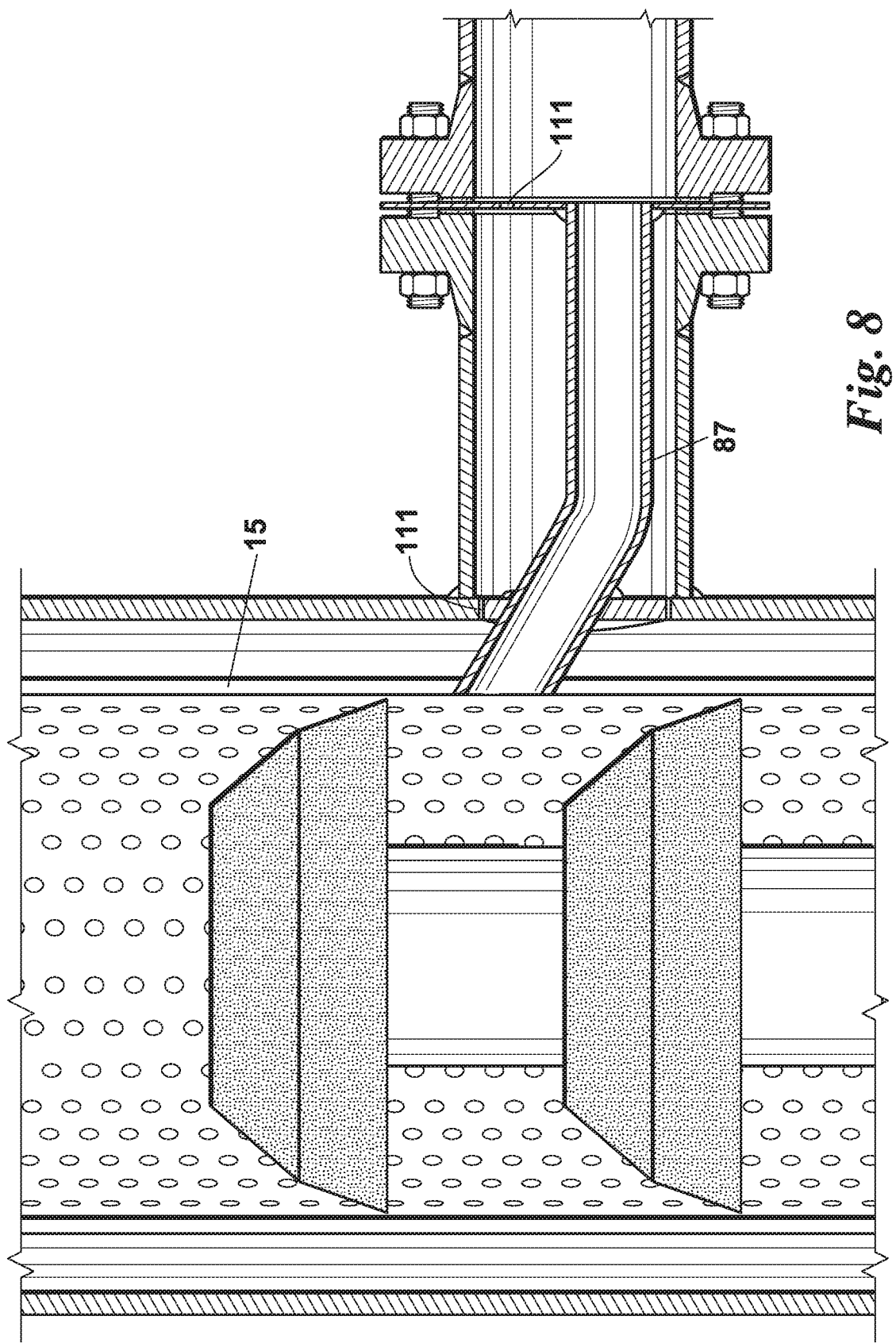
Figure 11:
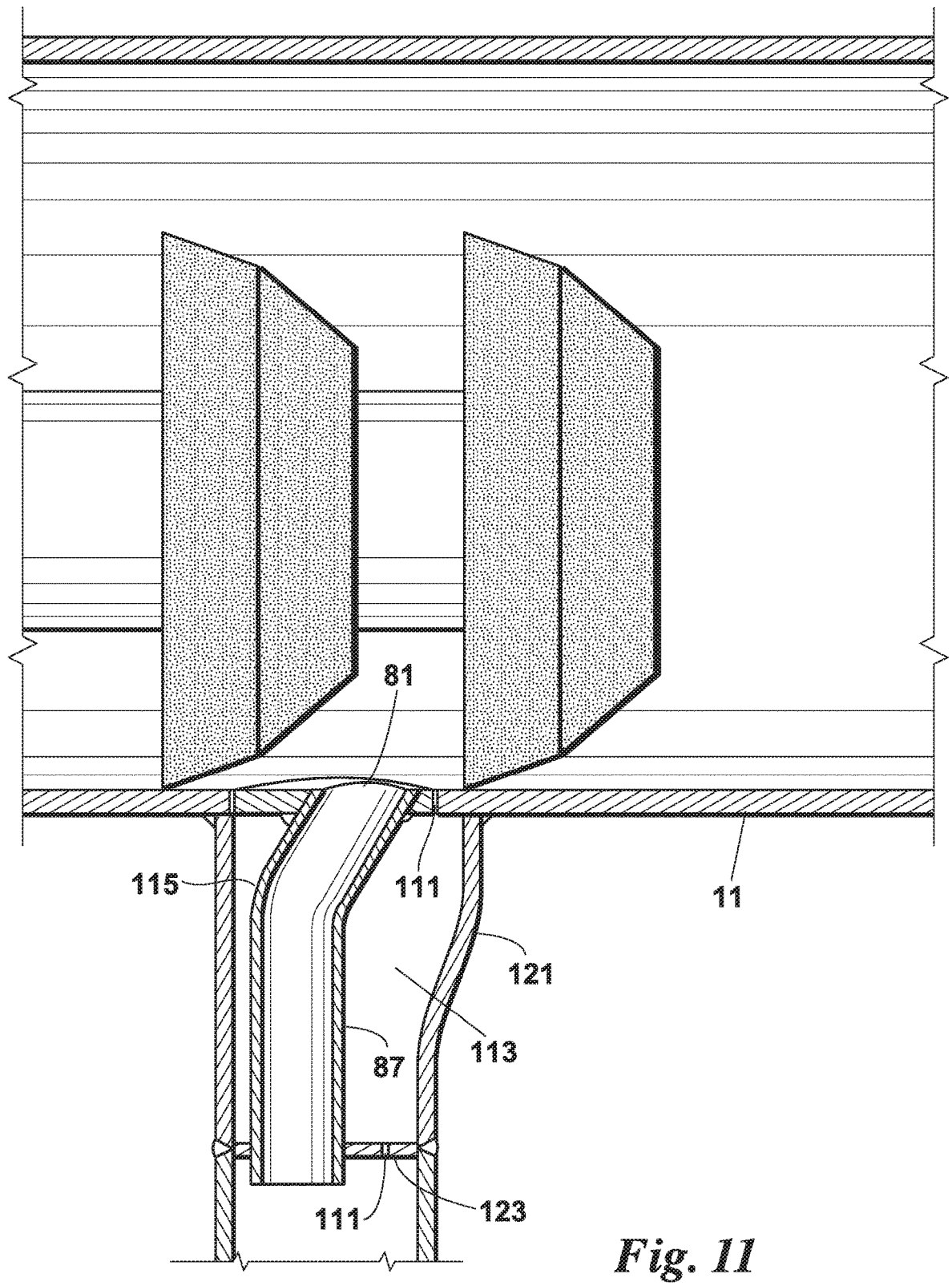

Referring to FIGS. 8, 9, and 11 in embodiments, there is at least one nozzle 81 for each pig or tool loaded in the barrel 11. In other embodiments, there are multiple nozzles 81 for each pig when needed. The nozzle 81 may be directed toward a lower half portion or area 73 of a back or rearward facing side 75 of the vertical member 71. In some embodiments, the nozzle 81 may be directed toward an upper half portion or area 77 of the vertical member. As the pig passes by the nozzle 81, the back side 75 of a second or subsequent vertical member 71 may be impinged upon, as well as a back or rearward side of the pig as it passes by the nozzle 81. The pig typically includes two or more vertical members 71.

Figure 12:
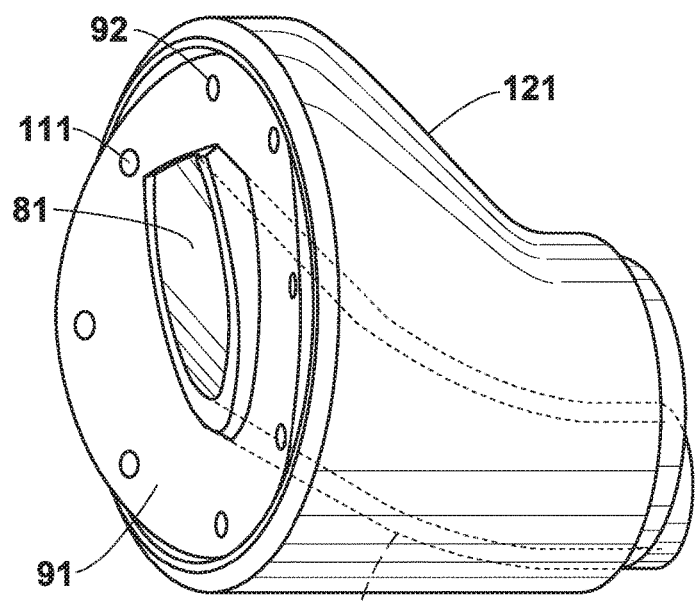
FIG. 12 is an isometric view of an embodiment of an injector or nozzle assembly. The eccentric body facilitates fit of the inner pipe and allows a jog or turn out of the radius to create the axial direction needed. The curved plate may include one or more ports that provide a leak path for pressure equalization.
Figure 13:
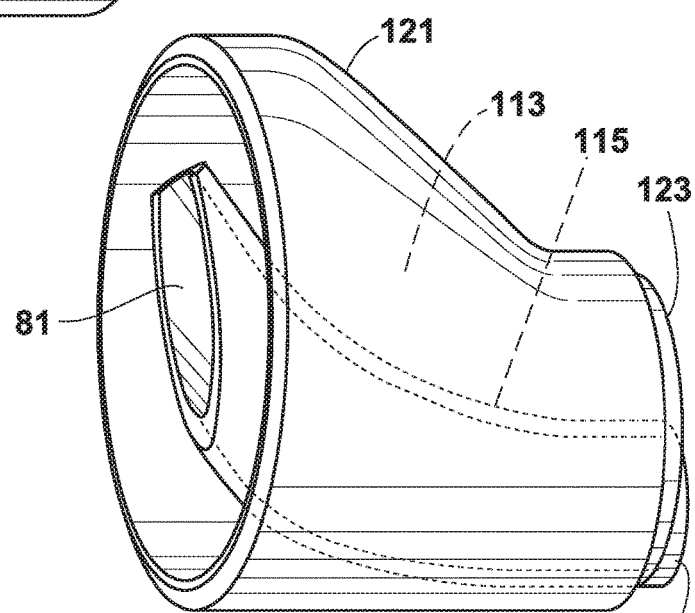
FIG. 13 is another isometric view of the injector or nozzle assembly without the curved plate which matches the barrel and indexes the nozzle. Removing the plate allows a better view of how the nozzle might terminate at the barrel to create the axial direction needed to form the force against the back of the pig, or a vertical member of the pig, to move the pig forward.
Figure 14:
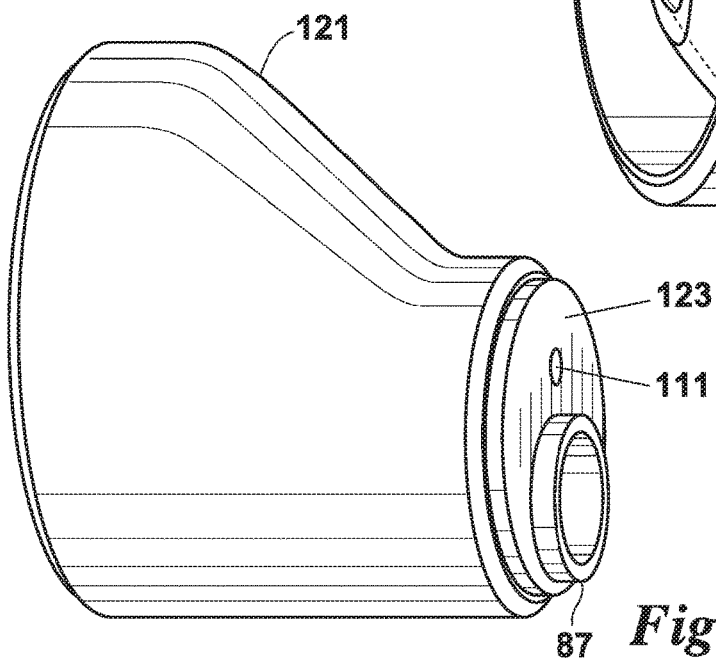
FIG. 14 is a reverse isometric view showing a reduced cross-section or blockage at the bottom of the housing. The plate that provides the blockage may include a port that provides a leak path for pressure equalization.

Referring now to FIGS. 12-14, embodiments of the injector or nozzle assembly 80 may include a housing or nozzle body 121 with a reduced cross-section or blockage 123 to ensure the main flow enters the nozzle 81 and can be controlled as a function of pressure. The blockage 123 may be a plate and may include one or more ports that provide a leak path 111 for pressure equalization. In some embodiments, the body 121 may be an eccentric reducer to save space or to allow the positioning required in a larger diameter pipe such as a branch connection. The eccentric reducer may be wider toward the nozzle end 101 than toward the inlet end 99. The body 121 may be sized to provide an annular area 113 to fill with fluid and pressurize around the outside annular surface 115 of the nozzle assembly 80.

With appropriate restriction of the nozzle-controlled discharge, velocities in excess of 1100 feet per second (335 mps) can be achieved without creating the need for pumps or compressors to do the same. In some embodiments, no added pump or compressor is needed as part of the launch system and method. As a jet of fluid is discharged into the barrel from the nozzle, the impulse or momentum from the jet serves to create a strong recirculation zone which feeds into the expanding jet, trapping secondary fluid and increasing the mass contained in the jet. As the jet propagates forward and loses velocity, the momentum remains high due to the additional mass assimilated into the jet. This mechanism allows work to be accomplished over a significant length of the jet as it expands. In some embodiments, this length has been measured to be greater than 40 inches (101.6 cm), longer than that of many pigs. Pig movement of more than 90 inches (228.6 cm) has been demonstrated on a 12.625-inch (32 cm) pig in test runs using only a single injector.

The discharge area of the injector or nozzle may be aimed downstream and against the back or rearward facing side of a vertical member of the pig such as a leading urethane element (disk or cup). The jet of fluid delivered by the nozzle hits the member to break the static friction and then interacts with each subsequent vertical member of the pig to add additional pressure or force, accelerating the pig forward as the pig moves away from the jet. The jet would then finally interact with the last vertical member of the pig as that member moves away from the nozzle. As the jet naturally expands as a free jet, the surface area of interaction increases at about a 15° included angle (which is inherent to an expanding jet). As such the jet velocity would stagnate for a static pressure front against the back side of the vertical member to keep the pig moving forward.

The discharge diameter or size of the injector or nozzle can be any diameter as needed to supply the force to break static friction and overcome dynamic friction and launch a pig of known weight and size. Different diameters and different pressures can be utilized to handle pigs of different weights and frictional issues.

The positioning of the jets may be placed at any radial angle required and may be positioned toward the front or back of the pig. In some embodiments, the nozzle is positioned so that the jet is at the bottom or 6 o'clock position and directed to impinge toward a rearward surface of the most forward vertical element. This lifts the pig to reduce the normal forces associated with friction and creates several points of impact to the pig for acceleration as the pig moves forward in the launch direction. Other clock positions may be used.

The nozzle 81 may have a single port or an array of ports. The angle $\alpha$ of the nozzle 81 is non-normal to a centerline of the barrel and may be designed for each application to deliver the optimum axial jet against the pig's vertical members. In embodiments, the nozzle angle $\alpha$ off of the horizontal axis is an oblique angle in a range of 5° to 85°, there being subranges within this broader range of 5°+X, 85°−X, X being an angle in a range of 1° to 35°. In other embodiments, the nozzle angle $\alpha$ is in a range of 10° to 80° there being subranges within this broader range of 10°+X, 80°−X, X being an angle in a range of 1° to 30°.

By way of a non-limiting example, in an embodiment the injector or nozzle is 1.42 inches (36 mm) in diameter, at a 38° angle off of horizontal, and arranged to direct the expanding gas or liquid jet against a lower surface area of the pig's vertical member to transmit the force against the pig. Once the pig moves and the static friction is significantly reduced; the pig will then move forward. As the jet hits sequential vertical members the pig will then accelerate to higher velocities. The momentum of the pig once out of the range of the nozzle then will carry it forward into the pipeline and as pressure builds behind the pig. Once in the reducer, the pressure integrates into and takes on the pressure of the main pipeline. Instantaneous velocities in tests of the system and method have been measured in excess of 200 fps (60.96 mps) using an accelerometer. Prior art launch units do not typically allow for fluid streams in excess of 7.3 fps (2.2 mps) and at most, in very rare occasions, 30 fps (9.1 mps) where pipeline product flow is in a range to support those velocities. Additionally, much of the velocity of these prior art streams is lost and performs no useful work because of how the stream enters the barrel relative to the pig.

Embodiments of this disclosure provide velocities unobtainable in typical kicker line operations, far in excess of 30 fps and pipeline product flow. Velocities may be achieved in excess of 100 fps (30.5 mps) as shown in the table below, including ranges and subranges covered by these velocities:

| fps | mps |
| --- | --- |
| 100 | 30.50 |
| 125 | 38.13 |
| 150 | 45.75 |
| 175 | 53.38 |
| 200 | 61.00 |
| 225 | 68.63 |
| 250 | 76.25 |
| 275 | 83.88 |
| 300 | 91.50 |
| 325 | 99.13 |
| 350 | 106.75 |
| 375 | 114.38 |
| 400 | 122.00 |
| 425 | 129.63 |
| 450 | 137.25 |
| 475 | 144.88 |
| 500 | 152.50 |
| 525 | 160.13 |
| 550 | 167.75 |
| 575 | 175.38 |
| 600 | 183.00 |
| 625 | 190.63 |
| 650 | 198.25 |
| 675 | 205.88 |
| 700 | 213.50 |
| 725 | 221.13 |
| 750 | 228.75 |
| 775 | 236.38 |

-continued

| fps | mps |
|---|---|
| 800 | 244.00 |
| 825 | 251.63 |
| 850 | 259.25 |
| 875 | 266.88 |
| 900 | 274.50 |
| 925 | 282.13 |
| 950 | 289.75 |
| 975 | 297.38 |
| 1000 | 305.00 |
| 1025 | 312.63 |
| 1050 | 320.25 |
| 1075 | 327.88 |
| 1100 | 335.50 |
| 1125 | 343.13 |
| 1150 | 350.75 |
| 1175 | 358.38 |
| 1200 | 366.0 |

As the pig moves forward, the injector or nozzle discharge would then interact with the subsequent vertical members as they move by, allowing added acceleration at each subsequent vertical member. As the final or last vertical member of the pig moves past the nozzle, the free jet of gas or liquid would then expand at a 15° included angle to continue acting against the pig with increasing surface area as the pig moves away. The free jet would also be increasing in mass as the jet diffuses more and more surrounding gas into the envelope of the free jet as it expands while maintain a velocity and expansion capability. The force against the back side of the pig can therefore continue to interact with the pig for a significant distance once the pig has passed the nozzle. This ensures the pig continues to move forward and also continues to accelerate for a distance before it begins to decelerate. Force may be controlled by pressure and diameter of the discharge diameter of the nozzle. It may also be controlled by modulation of the fluid entering and exiting the nozzle by means of a valve. A supersonic nozzle, such as but not limited to a converging-diverging nozzle or its equivalent, can also add to the force capability.

In embodiments, the total time for the jet to propagate forward, move the pig into the launch position, and launch the pig is approximately 1 second or less. In many cases, the actual launch time is about 0.5 seconds or less. These launch times are short enough that the instruments in the main line should not be able to tell the difference between the throttling of the main bypass valve and operational noise relative to such sources as friction, pumps, and downstream filtering. Once the first pig is launched, the mechanicals will return to their normal operational position.

The velocity of the jet is extremely high in close proximity of the pig being launched and then decays over the length of the jet envelope in a predictable manner. This predictability allows a designer to design or specify the right injector nozzle for a given launch application. In some embodiments, the jet can maintain a significant velocity. For example, velocities of 200 fps (60.96 mps) or more may be achieved (up to sonic and, in the case of gas, supersonic), and these higher velocities may be maintained over a length in a range of 30 to 40 inches (76.2 cm to 101.6 cm) downstream of the discharge point. This allows the energy (momentum) inherent to the jet to create an impulse force anywhere along its length that can push the pig forward by reacting against the vertical members of the pig. The nature of a gaseous-free jet allows for the entrainment of significant volumes of secondary gas due to the recirculation zone created by the expansion, recirculation zone, and momentum exchange between the high and low velocity fluids. This general mechanism of fluid exchange allows the directed jet to gain mass as it expands and lowers in velocity.

These velocities coupled with the mass flow of the jet can create impulse forces of several hundred pounds or more to impart the force needed to move pigs weighing hundreds of pounds. The effective length of the working jet envelope can, depending on the design of the nozzle be well over 40 inches (101.6 cm) in length. Because the length of most pigs is under this effective length, the system and method can be highly effective at launching pigs having a length falling within this envelope. For longer pigs the nozzle design may be changed to increase the working length of the jet or a plurality of nozzles may be combined to provide several points of force against the pig (or some combination of the two).

Modeling of the jet exiting the injector or nozzle has shown the nozzle can create velocities at sonic conditions and supersonic conditions. A sonic or near sonic free jet allows a force to be applied to the pig (in close proximity to the nozzle) that is roughly 100 times or more than the typical operation parameters currently observed in prior art launch systems. Under these velocities, the static friction is easily broken and the pig is allowed to move forward into the pipeline without the potential to stall due to zones of enhanced friction normal to the pipe segment.

By way of a non-limiting example, if an injector or nozzle was designed to deliver a gas mass flow of 1 lb. per second (about 0.45 kg/s), the entrainment rate of secondary gas would be roughly 9 lbs. per second (about 4.1 kg/s). Therefore, the overall rate at a point 10 to 15 inches (25.4 to 38.1 cm) from the nozzle would be roughly 10 lbs per second (about 4.5 kg/s) and the velocity at this point would be about 250 fps (76.2 mps). The momentum created by this flow and available to the pig for a 1 second interaction is 2500 lbs fps (10 lbs per second×250 ft per second×1 second). Depending on application specifications and requirements, a nozzle may be designed to deliver mass flow rates less than, equal to, or greater than 1 lb. (0.454 kg) per second.

Therefore, the launch system and method can create a significant force to the pig with a minimal amount of fluid. In many cases pipeline operators are requesting fluid at very low main pipeline flow or velocity. In some cases this specified velocity can be less than 2 mph (about 2.95 fps or 0.9 mps) and, in other cases, less than 1 mph (about 1.47 fps or 0.45 mps). Embodiments of the launch system and method can provide workable launch scenarios at these low velocities. The velocity of the entering fluid (through the injector or nozzle) is being controlled at higher velocities than the bulk fluid within the barrel, allowing the jet to generate appreciably higher forces against the pig by design. It also allows the injector to apply this force at multiple points as the pig moves forward. The pig will be pushed into the eventual integration point of the reducer where it will move into the pipeline as a successful launch. In comparison, the prior art technologies will have a very hard time generating launch velocities at or below these low flow rate scenarios, and would not develop a sufficient static pressure at these low flow rates to push the pig forward in an auto launcher.

In embodiments, the use of specifically spaced injectors or nozzles allows the indexing and controlled launching of properly spaced pigs using only control valves such as solenoid valves. This approach allows the launching of the first pig as needed and the subsequent launching of the next pig when required without retention pins or mechanical interlocks. The second pig will move forward with the impulse force applied to the pig by means of a jet provided by the second injector nozzle. The second pig will then move into the area vacated by the first pig, where the first injector can apply a second impulse force to the vertical members of the pig. This will accelerate the pig and continue its movement through the barrel of the launcher, ensuring a controlled movement of the pig through the barrel.

When a second pig is required the same scenario is again repeated but with the second directed jet being energized. The first jet may be re-energized to allow the force applied to the pig to remain strong as the pig exits the second impulse zone and enters the first impulse zone. As the second impulse zone created by the second jet begins to lower in force the design would have the pig then move into the first impulse zone created by the first injector or nozzle, thereby maintaining a strong force against the working surfaces of the pig until it is integrated into the pipeline and subsequently launched. This then repeats for each subsequent pig in the line.

With sufficient separation of pigs, the need for hydraulic or pneumatic pins to hold the pigs back are no longer needed, making the hydraulic unit, controls, and hoses also no longer necessary. The system becomes greatly simplified with only a few small inexpensive valves needed which can be driven by an inexpensive multi-loop controller. In some embodiments, if needed an opposing jet may be used to hold the pigs in queue while the launch pig is thrust forward toward the reducer. For example, an opposing jet may be accomplished by an injector or nozzle pointed in a direction opposite that of the launch direction (e.g., toward the closure door as opposed to away from the door). This would provide additional control to manage the driving and opposing forces.

The launch system may also be used in pig launchers that currently use internal screw-type devices to push the pig into the pipe reducer located at the end of the barrel. The screw device helps to ensure that pigs are reliably delivered into the launch position and can help to overcome any debris or sediment in the line that could retain pigs from launching. The turbulence created by the concentrated jet should also help to maintain a clean barrel section within the launcher. The entrainment capabilities should also allow the momentum of the jet to entrain solids and sediment and sweep those away into the pipe line where higher velocities will keep solids and sediment entrained.

Accelerating the entering fluid to velocities approaching sonic fluid regimens allows for significant capabilities to be realized otherwise unachievable with practical operational procedures. The free jet formed expands prior to interacting with the elemental components associated with the pigging device. As the jet stagnates against the surfaces formed by the pig, significant forces to the pig can be realized well in excess of the forces that can be realized with the prior art approaches.

This directed jet approach allows several significant changes to be made during the design and fabrication of a launcher to ensure the end user has the force needed to successfully integrate a pig or tool into the pipeline. For example, a larger diameter injector or nozzle allows more mass flow at the same velocity, when pressures are conserved, than does a smaller diameter injector or nozzle. A higher differential pressure allows increased velocities and subsequent higher stagnation pressures that elevate the force profile against a given pig. Angular changes to the nozzle allows the jet to be placed where needed, ensuring the force against the pig is optimized both initially and as the pig moves away from the point of discharge. Multiple nozzles can be applied to excessively large and heavy pigs, allowing more force be applied when needed. The launcher can also be built to allow bi-directional use when a customer has a specific need for such a device.

The hardware used in achieving this force application also allows for easy field retrofit. Properly isolated field equipment can be flame- or plasma-cut to allow the necessary additional kicker lines or pipe stubs. Placing an injector in added pipe stubs converts a launcher designed for manual launching of pigs into an auto-launcher.

In a test of an embodiment of the launch system and method, three pigs were loaded into a launcher barrel that included three injectors or nozzles, with each nozzle located at an existing kicker line location. The pigs were spaced apart from one another so that the first (most downstream) nozzle was directed toward a back surface of vertical member of the first pig. The second and third nozzles were directed toward a back surface of a vertical member of the second and third pigs, respectively. A main line bypass valve was throttled down to divert flow into a header connected to the injectors. A first control valve connected to the first injector was opened and the injector nozzle delivered a concentrated jet of fluid. The pig moved into a launch position, subsequently launched, and did not affect the position of the second and third pigs. After this first pig had launched, the process was repeated for the second pig, this time by opening the second valve. When this pig entered the area vacated by the first pig, the first injector delivered a concentrated jet that further accelerated the pig. The process was again repeated for the third pig.

Embodiments of an injector or nozzle assembly of this disclosure, configured for use in a pig trap, may include at least one nozzle arranged along an inside wall of the pig trap at an oblique angle less than 90° relative to horizontal and sized to deliver a jet of fluid in a downstream direction at a velocity greater than that of a main pipeline product flow in fluid communication with the pig trap nozzle assembly. The portion of a main pipeline product flow entering the nozzle assembly may be directed toward a back side of a pig element of the pig. The pig element may be a vertical member such as a urethane disk or Embodiments of a pig trap fluid injector assembly of this disclosure may include one or more of the following features:

a longitudinally extending pipe including an inlet end, an outlet end, and at least one bend located in between said ends at an oblique angle α relative to horizontal;

a flat-profile flange located at the inlet end and including a plurality of bolt holes;

a flat-profile flange including one or more ports to provide a leak path through the flange;

a curved-profile flange located at the outlet end, the curved-profile flange including an opening for the nozzle;

a curved-profile flange including one or more ports to provide a leak path through the flange;

a nozzle located at the outlet end;

in an installed state, the nozzle is oriented non-normal to a centerline of the barrel to deliver a jet of fluid in a direction opposite that of a closure door of the pig trap;

in an installed state, at least one leak path is formed between the sidewall opening and a periphery of the curved-profile flange;

a housing containing the nozzle;

a housing containing the nozzle that is wider toward the outlet end than the inlet end;

a curved-profile flange configured complementary to a curvature of a sidewall of the pig trap.

the nozzle including a valve;
a valve state indicator in communication with the valve;
at least one passageway between a sidewall opening and the curved-profile flange being a circumferential passageway.

A pig trap of this disclosure may include one or more of the above features and following features:
a barrel including a sidewall opening;
at least one nozzle located within the sidewall opening at non-normal angle α relative to horizontal and oriented to deliver a jet of fluid in a direction opposite that of a closure door of the pig trap;
at least one fluid leak path located between the sidewall opening and a periphery of the least one nozzle;
the at least one nozzle including a valve;
a valve state indicator in communication with the valve;
a controller including executable instructions in communication with the valve and the valve state indicator;
the barrel including at least one positioning pin located along a floor of the barrel and configured to indicate an axial location of a pig when in the barrel;
a curved fluid distribution grid in communication with the at least one nozzle and located in a lower half of the barrel above a floor of the barrel, the fluid distribution grid including a perforated matrix containing a plurality of ports.

A method of launching a pig or tool into a pipeline system may include one or more of the above nozzle assembly and pig trap features and one or more of the following:
diverting a portion of a main pipeline product flow into a nozzle located within a sidewall opening of a barrel of a pig trap, the nozzle oriented at an oblique angle α relative to horizontal;
discharging a part of the diverted portion through the nozzle toward a back side of a vertical element of the pig, the discharge part impinging on the back side of the vertical element;
the discharged part impinges upon at least one other trailing vertical element of the pig as the pig moves forward in the barrel;
a velocity of the discharged part in excess of 100 fps (30.5 mps);
launch forces of more than 10 to 15 times that of a conventional launcher.

Embodiments described herein provide examples or arrangements of a launch system and method of this disclosure. Modifications may be made in its construction or use without departing from those examples. The following claims define the invention and include the full range of equivalents to which each recited element is entitled.

What is claimed:

1. A directed jet impulse pig launching system comprising:
 a pig trap fluid injector assembly, the pig trap fluid injector assembly comprising:
  a longitudinally extending pipe including an inlet end, an outlet end, and at least one bend located in between said ends at an oblique angle α relative to horizontal;
  a flat-profile flange located at the inlet end and including a leak path through the flat-profile flange and a plurality of bolt holes; and
  a curved-profile flange located at the outlet end and including a leak path through the curved-profile flange and an opening;
  a nozzle connected to the longitudinally extending pipe and located at least partly in the opening;
  a kicker line surrounding the longitudinally extending pipe between the inlet and outlet ends and forming an annular space about the longitudinally extending pipe, the annular space being in communication with the leak paths of the flat- and curved-profile flanges;
  wherein when the pig trap fluid injector assembly is installed in a sidewall opening of a pig trap, the nozzle is oriented to deliver a jet of fluid in a downstream direction,
 the jet of fluid being at a velocity greater than that of a main pipeline flow velocity to create concentrated forces significantly higher than the forces generated when pipeline product flows into the back of the launcher as is the case with a typical kicker line operation.

2. The directed jet impulse pig launching system of claim 1, further comprising:
 a housing containing the nozzle and forming an annular space between the housing and an outside surface of the nozzle.

3. The directed jet impulse pig launching system of claim 2, further comprising, the housing including a restrictor plate at one end.

4. The directed jet impulse pig launching system of claim 3, further comprising, the restrictor plate including at least one port to provide a fluid leak path through the restrictor plate.

5. The directed jet impulse pig launching system of claim 1, further comprising, the curved-profile flange configured complementary to a curvature of a sidewall of the pig trap.

6. The directed jet impulse pig launching system of claim 1, further comprising:
 the nozzle including a valve.

7. The directed jet impulse pig launching system of claim 6, further comprising:
 a valve state indicator in communication with the valve.

8. A pig trap comprising:
 a barrel including a sidewall opening; and
 a directed jet impulse launching system including:
  a kicker line connectable to the barrel;
  a longitudinally extending pipe smaller in diameter than, and surrounded by, the kicker line, the longitudinally extending pipe including a flat-profile flange at an inlet end and a curved-profile flange at an outlet end to match a curvature of the sidewall opening, each of said flanges including a leak path through the flange;
  at least one nozzle connected to the longitudinally extending pipe and located at a non-normal angle α relative to horizontal and oriented to deliver a jet of fluid into the barrel through the sidewall opening in a direction opposite that of a closure door of the pig trap.

9. A pig trap according to claim 8, further comprising:
 the at least one nozzle including a valve; and
 a valve state indicator in communication with the valve.

10. A pig trap according to claim 9, further comprising:
 a computer including executable instructions in communication with the valve and the valve state indicator.

11. A pig trap according to claim 8, further comprising, the barrel including at least one positioning pin located along the barrel and configured to indicate an axial location of a pig when in the barrel.

12. A pig trap according to claim 8, further comprising:
 a curved fluid distribution grid in communication with the at least one nozzle and located in a lower half of the barrel above a floor of the barrel, the fluid distribution grid including a perforated matrix containing a plurality of ports.

13. A method of launching a pig into a pipeline system, the method comprising:

diverting a portion of a main pipeline product flow into a nozzle located within kicker line connected to a sidewall opening of a barrel of a pig trap, the nozzle oriented at non-normal angle α relative to horizontal; and discharging a part of the diverted portion through the nozzle at a velocity at least 30 times that of the main pipeline product flow toward a back side of a vertical element of the pig, the discharged part impinging on the back side of the vertical element;

wherein the nozzle is connected to a longitudinally extending pipe surrounded by the kicker line, an annular space being formed between the kicker line and the longitudinally extending pipe; and wherein the longitudinally extending pipe includes an inlet end having a flange, an outlet end having a flange, and at least one bend located in between said ends, each flange including a leak path through the flange to the annular space.

14. A method according to claim 13, further comprising:
further accelerating the pig forward in the barrel by the discharged part impinging upon at least one other trailing vertical element of the pig as the pig moves forward in the barrel.

15. A method according to claim 13, further comprising:
allowing a portion of main pipeline product flow to flow into the longitudinally extending pipe, and
raising a pressure around the longitudinally extending pipe by allowing a portion of the main pipeline product to flow into the leak paths to fill the annular space.

16. A method according to claim 13, further comprising:
the nozzle delivering a fluid entry velocity in a range of 100 fps to 1200 fps.

17. A method according to claim 16, wherein the mainline product flow is at a velocity no greater than about 2 mph.

18. A method according to claim 13, further comprising:
the discharged part impinging on the back side of the vertical element producing an elevated stagnation pressure against the back side of the vertical element;
wherein the elevated stagnation pressure creates a launch force at least 10 times greater than that of a same sized kicker line not including the nozzle and discharging the portion of the diverted flow.

19. A method according to claim 18, wherein the launch force is in a range of 15 to 100 times greater.

* * * * *